United States Patent [19]

Kawamura et al.

[11] Patent Number: 5,737,293
[45] Date of Patent: Apr. 7, 1998

[54] DISC LOADING APPARATUS FOR LOADING OPTICAL DISCS IN A CARTRIDGE OR WITHOUT

[75] Inventors: Ichiro Kawamura; Shinichi Maeda, both of Osaka, Japan

[73] Assignee: Matsushita Electric Industrial Co. Ltd., Osaka, Japan

[21] Appl. No.: 530,429

[22] Filed: Sep. 19, 1995

[30] Foreign Application Priority Data

Sep. 21, 1994 [JP] Japan .................................. 6-226203

[51] Int. Cl.⁶ .................................................. G11B 23/03
[52] U.S. Cl. .................... 369/77.1; 369/77.1; 369/77.2
[58] Field of Search ................................. 369/75.1, 75.2, 369/77.1, 77.2, 178, 191, 192

[56] References Cited

U.S. PATENT DOCUMENTS

| | | | |
|---|---|---|---|
| 5,142,523 | 8/1992 | Kamoshita | 369/75.2 |
| 5,173,894 | 12/1992 | Kido | 369/75.2 |
| 5,299,185 | 3/1994 | Sakurai et al. | 369/75.2 |
| 5,301,176 | 4/1994 | Kawachi et al. | 369/75.2 |
| 5,301,177 | 4/1994 | Kumakura | 369/75.2 |
| 5,572,498 | 11/1996 | Choi | 369/75.2 |

*Primary Examiner*—Robert S. Tupper
*Assistant Examiner*—Brian E. Miller
*Attorney, Agent, or Firm*—McDermott Will & Emery

[57] ABSTRACT

The present invention enables a disc loading apparatus to handle both a bare disc and a disc housed in disc cartridge for writing/reading signals, which comprises a holding device consisting of a first holding device for elastically fitting with holding cuts provided at both sides of a disc cartridge inserted in an inserting gate and a second holding device for elastically holding the circumferential edge of a bare disc inserted in said inserting gate, which device is movable along a direction connecting said inserting gate and a table, and a transfer means to carry said holding device so that disc and a disc housed in said disc cartridge travel between said inserting gate and said turn table; thus a bare disc and a disc cartridge are selectively held by the holding device to be loaded.

4 Claims, 18 Drawing Sheets

DISC LOADING APPARATUS FOR LOADING OPTICAL DISCS IN A CARTRIDGE OR WITHOUT

FIELD OF THE INVENTION

The present invention relates to a disc loading apparatus for optical discs and other types of discs.

BACKGROUND OF THE INVENTION

In the recent years, optical discs have been increasingly used in various fields of application, such as the compact disc(CD) technology, which is a reproduction-only medium, and the recording/reproducing sector, which includes image files, data files, and document files. The advantages associated with optical discs attribute to their increased popularity. For example, they provide higher recording density, longer life expectancy due to their non-contact type recording/ playing, and faster random access time over other types of media, such as a tape.

A conventional disc loading apparatus used for loading and transferring discs is shown in FIGS. 18 and 19.

FIGS. 18 and 19 show a conventional disc loading apparatus having the following elements installed on its main chassis 53a: a disc motor 56, a turn table 58 affixed to a shaft of the disc motor 56, a center cone 58a on the turn table 58 which fits with a center hole 45a of a record disc 45, a head 43 attached with a linear motor coil 43a, which is guided by a guide shaft 55 that is slidable in the Y1–Y2 direction, and a magnetic yoke 54 used for a linear motor. The main chassis 53 has a hole 53b at its one end 53a, which an axis 51 may be provided and rotated. Also, a clamp arm 47 has a hole 47b at its one end 47a, where an axis 51 is disposed for rotating the clamp arm 47. The axis 51 is fixed to an extrusion 52 within a casing 42. A tray 41 is installed inside the casing 42 which is movable along the Y1–Y2 direction driven by a loading motor 57. The loading motor 57 is provided with a reduction gear head having a rack 41a on the rear surface of the tray 41, and is engaged with the teeth of the output wheel of the gear head. The tray 41 has a dish shape cavity 46 for receiving the disc 45.

In addition, a cam 50 is provided at the rear end of the main chassis 53 and clamp arm 47. The cam 50 is driven by a geared motor 49. Depending on the position of the cam 50 and the clam arm relative to the axis 51, the main chassis 53 and the clamp arm 47 can be positioned either close together or far apart from one another. A disc receiving opening 40 is provided with an opening 41b and a clamper 48 for receiving a disk.

The loading motor 57 and the geared motor 49 are driven by conventional microcomputer controls. The cam 50 and tray 41 are driven individually by separate motors, and the means for detecting their positions is by a conventional microswitch and related mechanisms(not shown).

The operation of a conventional disc loading apparatus is shown in FIGS. 19(a), (b), and (c). By pressing the eject/ load switch 60, as shown in FIG. 18, a microcomputer drives the loading motor 57 to transfer the tray 41 in the Y2 direction to bring it out of the casing 42 to the position shown in FIG. 19(a). In the meantime, the clamp arm 47 and the main chassis 53 are separated, with the center of revolution of the clamp arm 47 at the axis 51.

Next, a disc 45 is placed on a cavity 46 of the tray 41B prior to pressing the eject/load switch 60. In response, the tray 41 is horizontally transferred, powered by the loading motor 57, through the inserting gate 40 to the inside of the casing 42, to the position as shown in FIG. 19(b). Thereafter, as shown in FIG. 19(c), the cam 50 rotates, with the axis 51 at its center, closing the clamp arm 47 against the main chassis 53. The disc 45 is held between the clamper 48 and the turn table 58 of the disc motor 56, where it becomes rotatably engaged with the center cone 58a.

At this point, the head 43 picks up and/or records data on the disc 45. Subsequently, the disc can be removed by a reversing the procedure as described above.

However, the disadvantage associated with the above-mentioned disc loading apparatus is that it works only with naked discs. For example, it may be used for reading a CD, CD-ROM, or the like, which do not have protective disc cartridges. However, read/write discs usually require protective cartridges. Therefore, problems arise because the conventional read/write disc player can not handle both a naked disc and the disc type having a protective cartridge.

SUMMARY OF THE INVENTION

The objective of the present invention is to provide a disc loading apparatus that handles both a naked disc and a disc housed in a protective cartridge, which is capable of writing signals on a disc, as well as reading signals from a disc.

In order to accomplish the above mentioned objective, the present invention disc loading apparatus comprises: a first holding device that elastically fits on holding notches provided at both sides of a disc cartridge, which is inserted in the disc receiving member, a second holding device that elastically fits the circumferential edge of a naked disc, which is inserted in the receiving opening, a holding means that is movable from the turn table to the disc receiving opening, and a transfer means for transferring the holding means so that the naked disc and a disc in the cartridge can be transferred between the disc receiving opening and the turn table.

According to the present invention, when a disc cartridge is inserted in the disc receiving opening, the notches provided at both sides of the cartridge is held by the first holding device. When a naked disc is inserted, the circumferential edge is held by the second holding device. The first and second holding devices are transferred by the transfer means from the disc receiving opening to the site of the turn table, where the disc is positioned to face towards the turn table.

In the present invention, a disc cartridge or naked disc can be selectively held by the first and second holding devices, respectively, while loading the apparatus. Accordingly, the disc loading apparatus of the present invention does not require a tray to hold the disc or disc cartridge. Therefore, the present invention makes it possible to design and fabricate a disc loading apparatus which is thinner compared with a conventional apparatus, wherein a disc or a disc cartridge is held on a tray.

The invention itself, together with further objects and attendant advantages, will best be understood by reference to the following detailed description taken in conjunction with the accompanying drawings.

DESCRIPTION OF THE PREFERRED EMBODIMENTS

The following description will discuss the disc loading apparatus for a recorder/player of the present invention with reference to FIGS. 1 through 13. The present invention disc loading apparatus comprises a holding means 2 and a transfer means 3, for selectively loading a naked disc 12 and a disc cartridge 9.

Figure 4:
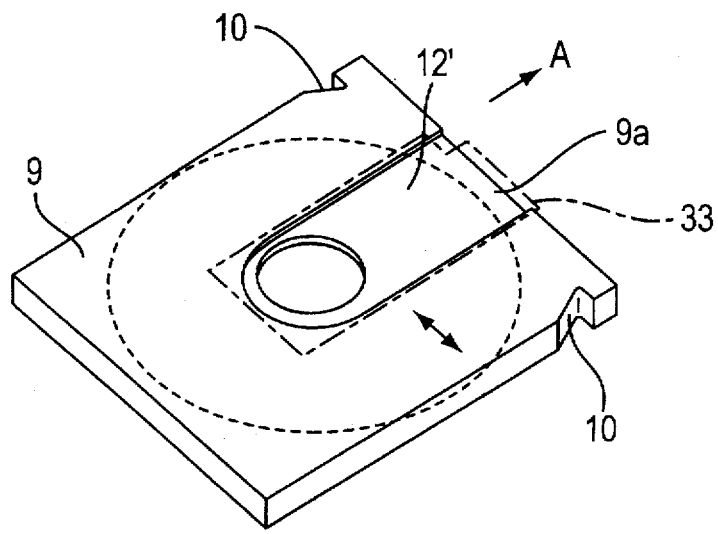
FIG. 4 shows a perspective view of a disc cartridge of the disc loading apparatus in FIG. 1.

As shown in FIG. 4, the Disc cartridge 9 houses a disc 12' and includes a disc exposing window 9a stretching from its center to its front edge, towards the inserting A direction. The disc cartridge 9 is provided with a sliding shutter 33, which is movable in the direction as indicated by the B direction, as well as notches 10 in both of its sides near its front edge, towards the inserting A direction. The discs 12 and 12' have a magnetic material in their centers for attaching to a turn table 5.

Figure 1:
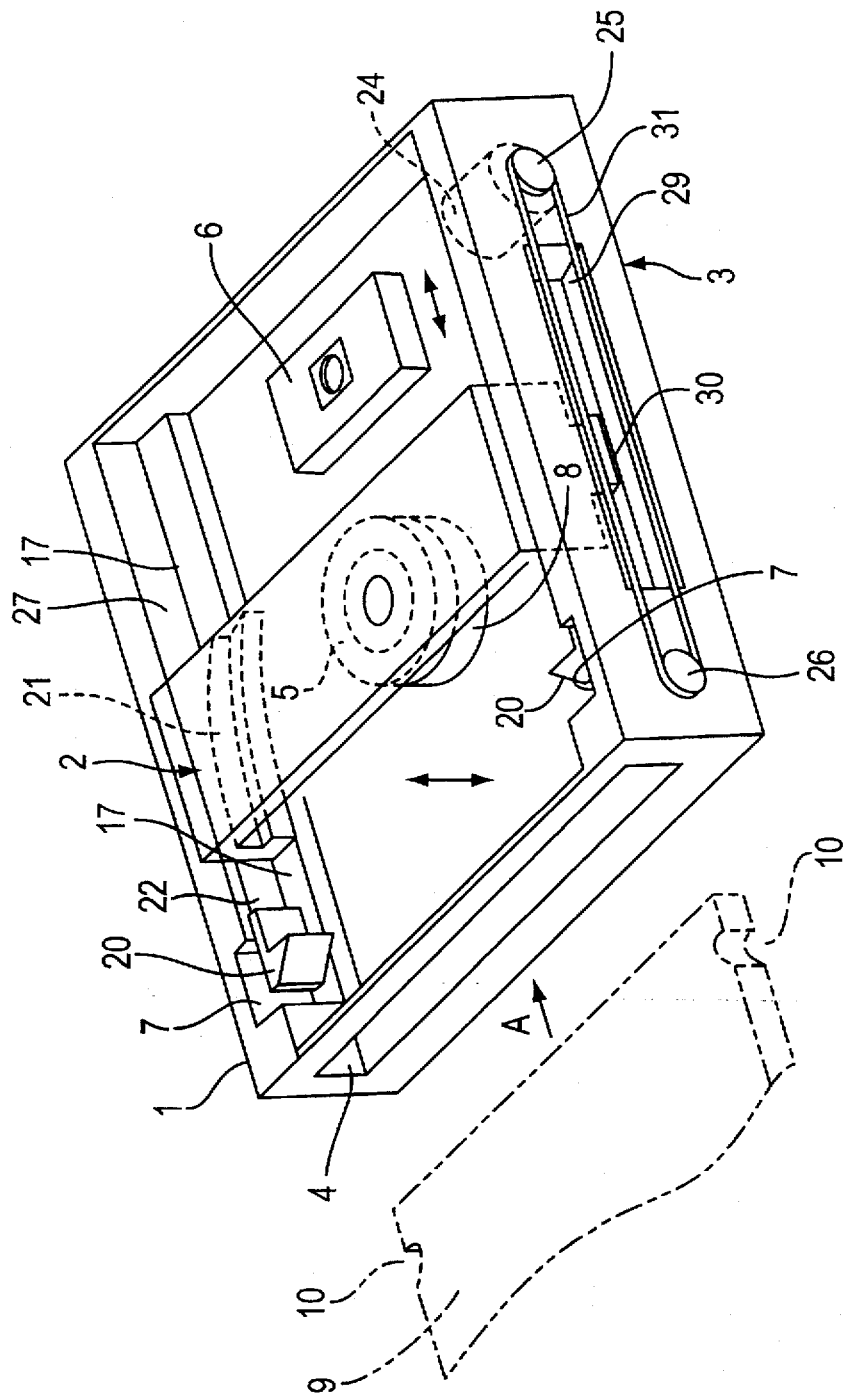
FIG. 1 shows a perspective view of a disc loading apparatus according to the present invention.

As shown in FIG. 1, the body of the recorder/player 1 has a flat-box shape, and a turn table 5 and a head 6 at the innermost end, away from a disc receiving opening 4. At the inner surface of the side walls 27 are platforms 17 and a slit 29 for transferring the holding device along each of the side walls. The inner surface of side walls 27 function as a slide guide for the holding means 2, as well as a control rail for regulating the opening and closing of a holding hooks 20. The inner surfaces of the side walls also have a recess 7 extending from a control rail, proximate to the disc receiving opening, for accommodating the opening and closing of the holding hooks 20. The turn table 5 is equipped with a magnet(not illustrated) for holding the discs 12 and 12'.

Figure 2:
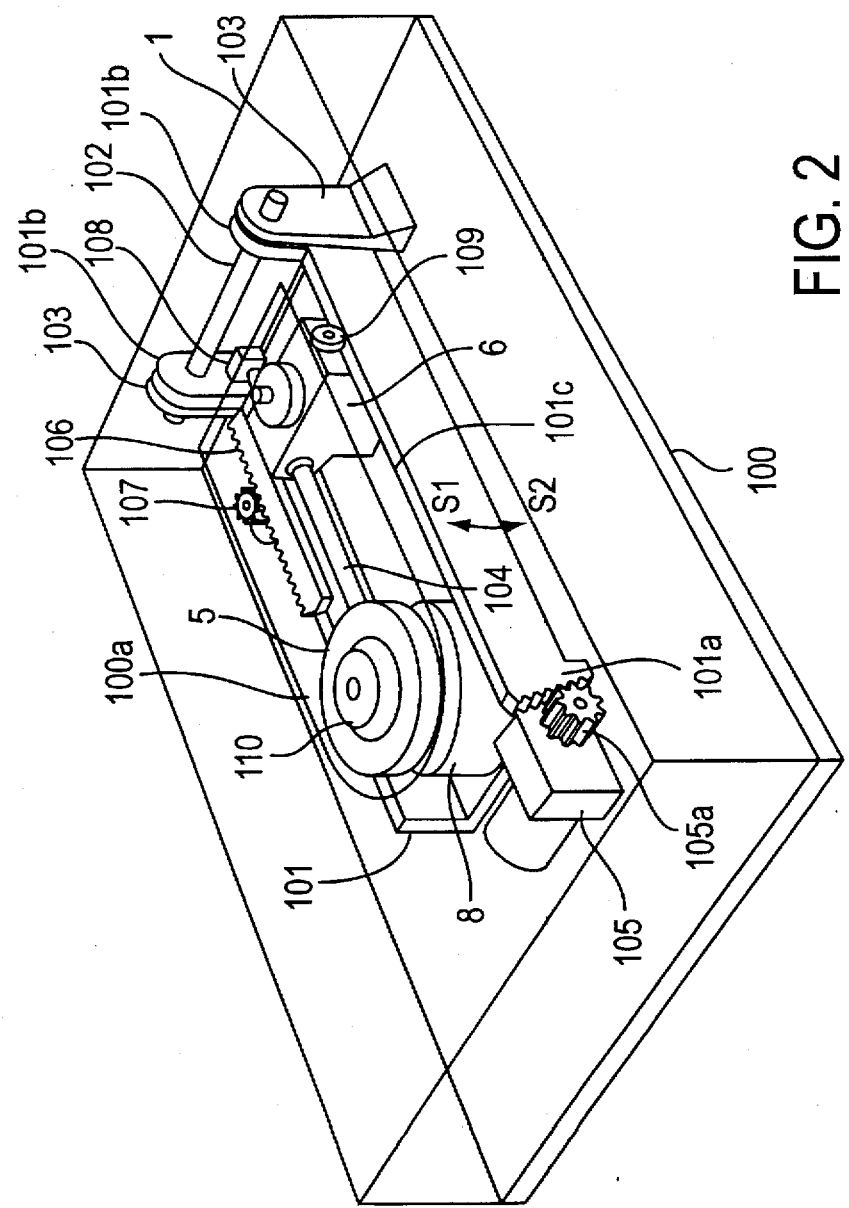
FIG. 2 shows a perspective view of a write/read sector of the disc loading apparatus in FIG. 1.

FIG. 2 shows a disc motor 8 having the turn table 5 and a write/read head 6 in the present invention recorder/player. A chassis 100 is located on the bottom of a recorder/player body 1 and is connected with the top part of the recorder/player body 1 at an opening 100a. A sub-chassis 101 part of the chassis 100 has a supporting part 101b at its one end, which holds a movable shaft 102. A straight position guide 101c is provided at a side-wall of the sub-chassis. Pedestals 103 are provided on the chassis 100 for holding the movable shaft 102. A geared motor 105 is affixed on the chassis 100 and has a toothed wheel 105a, which engages its teeth 101a with the edge of a straight position guide 101c. A rail 104 is fixed on the sub-chassis 101 with a stand 108 slidably holding the head 6. A roller 109 rolls along the straight position guide 101c. The position guide 101c, having a rail 104, guides the movement of the head 6. A rack 106 on the head 6 is engaged with the pinion of a transfer motor 107 on the chassis 100. The turn table 5 has a center boss 110.

According to the present invention, the sub-chassis 101 is driven vertically in the S1–S2 direction, as it is rotated about the movable shaft 102 by the geared motor 105. The sub-chassis 101 either transfers the turn table 5 toward a disc 12, 12' for attaching the disc 12, 12' to the turn table, or away from the disc for detaching the disc 12 or 12' from the turn table. Meanwhile, the head 6 is moved in a direction toward the of disc motor 8 along the rack 106, by means of the rotation of the transfer motor 107. As the disc motor 8 rotates a disk 12 on the turn table 5, the head 6 scans the surface of the disc 12 to have the disc information recorded/read.

Figure 3:
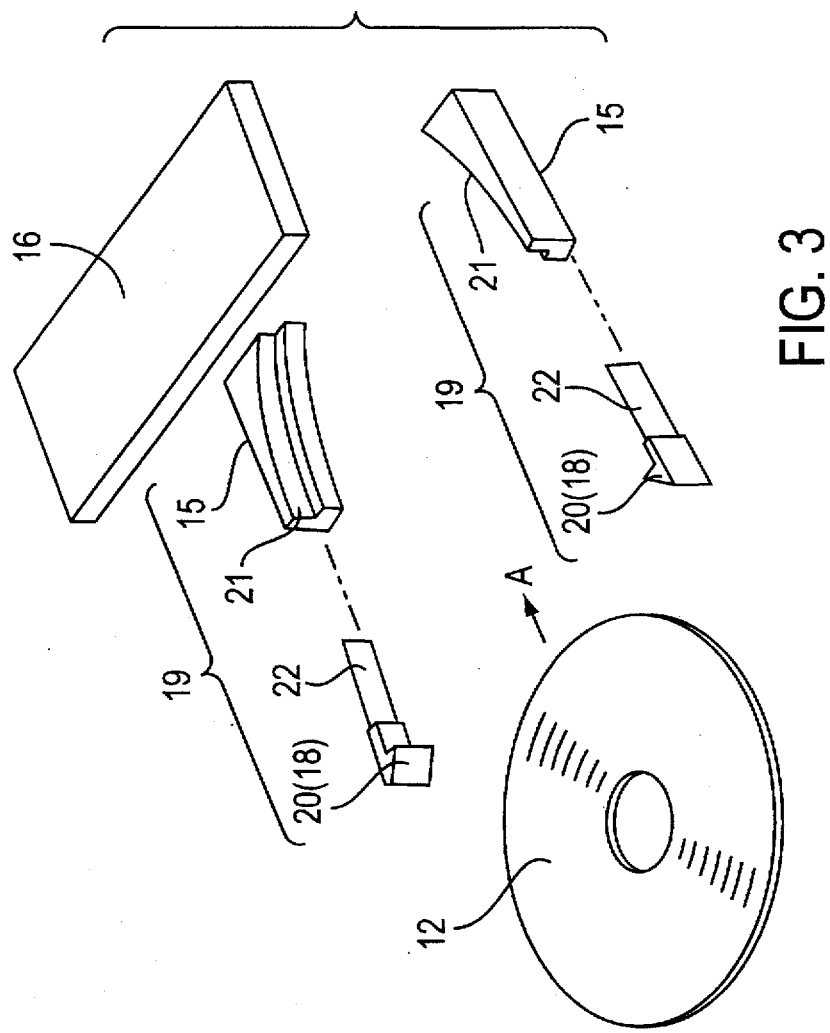
FIG. 3 shows a perspective view of a holding means, exploded, of the loading apparatus in FIG. 1.

As shown in FIG. 1, the holding means 2 is freely movable inside the recorder/player body 1, in the direction from the turn table 5 towards the disc receiving opening 4. As shown in FIG. 3, the holding means 2 comprises a first holding device 18 and a second holding device 19. The first holding device 18 elastically fits with the notches 10 in both sides of a disc cartridge 9, that had been inserted at the disc receiving opening 4. The second holding device 19 elastically fits with the circumferential edge of a naked disc 12, that had been inserted at the disc receiving opening 4.

As shown in FIG. 3, the present invention has a loading means comprising a moving body 16 and a pair of aligning devices 15 provided at both sides of the moving body 16. The aligning devices regulate the positioning of a disc 12 by contacting the disc's edges at its front circumferential edge, while it is being inserted in the A direction. The loading apparatus further comprises a pair of spring reeds 22 extending from the aligning devices 15 towards the disc receiving opening 4, which can elastically deform in opposite directions, and a pair of holding hooks 20 affixed so as to face each other at the end of spring reeds 22. The pair of holding hooks 20 fit with either the rear circumferential edge of a disc 12 or the notches 10 of a disc cartridge 9. The aligning devices 15 are provided with arc hollows 21 for receiving the circumferential edge of the disc 12.

As shown in FIG. 1, a bridging board 30 is fixed to the moving body 16, and moves along the transfer slit 29. Referring to FIG. 3, the second holding device 19 is comprised of the aligning devices 15 and the holding hooks 20. The first holding device 18 and second holding device 19 share common holding hooks 20.

Variations of the present invention described above are possible. For example, although the board-shaped moving body 16 and the aligning devices 15 are formed having several elements in the present invention, these elements may also be formed as a single component in an alternate embodiment.

Secondly, in the present invention, both sides of the moving body 16 and the aligning devices 15 are slidably guided by the inner surface 27 of side walls of the recorder/player body 1 and the platforms 17. The spring reed 22 includes a metal leaf spring which is attached to the aligning device 15 with a connecting means. However, in an alternate embodiment, the spring reed 22 and the aligning device 15 may be attached directly to one another.

In the present invention, the holding hook 20 is molded plastic, and may be attached either directly to the edge of the spring reed 19 or connected by a connecting means. The inner surface 27 of side walls of the recorder/player body 1 regulates the opening and closing of the holding hooks 20 so as to prevent the holding hooks 20, fitted to a disc 12 or a disc cartridge 9, from opening. The recess 7 of inner surface regulates the holding hooks 20 by allowing the holding hooks to open and disengage from a disc 12 at the recess 7. At which point, the disc 12 or the disc cartridge 9 becomes detachable.

The transfer means 3 transfers the holding means 2 so that a naked disc 12 or a disc within a disc cartridge 9 moves between the disc receiving opening 4 and the turn table 5. The transfer means 3 is comprised of a motor 24 located at the rear, side, end of the transfer means 3, opposite to the disc receiving opening 4. The transfer means 3 further includes a driving pulley 25 as part of the motor 24 and a conveying belt 31 extending between the pulley 25 and an idle pulley 26, which is proximate to the disc receiving opening 4.

One side of the bridging board 30 extrudes through the transfer slit 29 and is connected with the conveying belt 31. Preferably, the driving pulley 25, idle pulley 26 and conveying belt 31 are provided with teeth(not illustrated) so as to enhance the engagement capabilities of their contact surfaces.

The geared motor 105 adjusts the height of the turn table 5 and motor 24 by positioning the holding means 2. The geared motor 105 is controlled by a control means(not shown) employing a detection means and microcomputer, etc.

Figure 6:
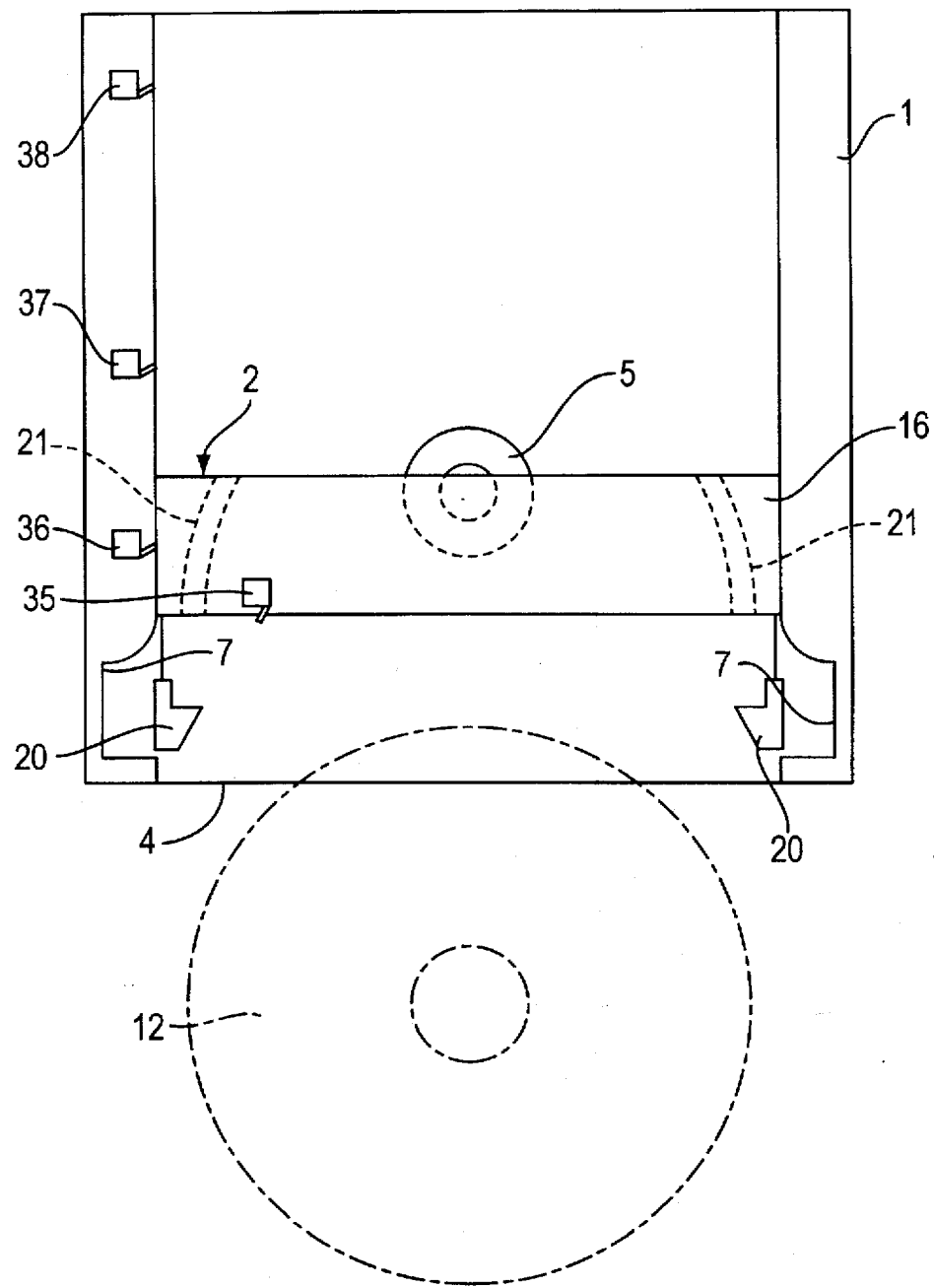
FIG. 6 shows a state of the disc loading apparatus in FIG. 1 before a naked disc is inserted.

The detection means comprises a disc cartridge detector 35 for distinguishing the type of object being inserted, as well as position sensors 36–38 for detecting the position of holding means 2, as shown in FIG. 6. The disc cartridge detector 35 determines whether the object inserted is a naked disc 12 or a disc cartridge 9. The disc cartridge detector 35 will be operated only if the disc cartridge 9 is present. Depending on the results obtained from the disc cartridge detector 35, the geared motor 105 is used to adjust the height of the turn table 5 so as to fit either a naked disc 12 or a disc cartridge 9.

The first position sensor 36 detects whether the holding means 2 is at stand-by position inside the disc receiving opening 4. The second position sensor 37 detects whether a naked disc 12 is on the turn table 5. The third position sensor 38 detects whether a disc 12', in a disc cartridge 9, is on the turn table 5. The motor 24 is operated to position the holding means 2 in the correct location, indifferent of whether it is a naked disc 12 or a disc cartridge 9.

Figure 5:
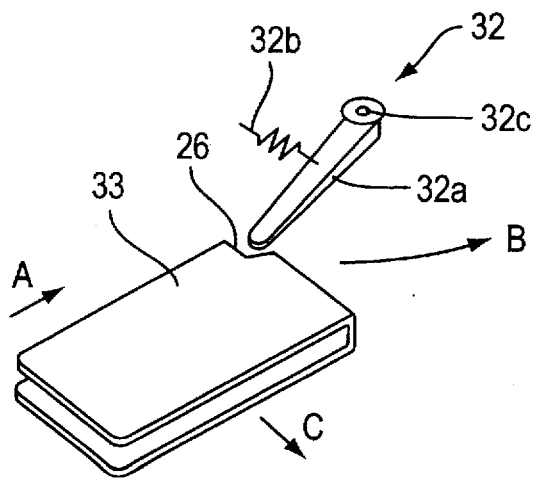
FIG. 5 shows a perspective view of a shutter opening device of the disc loading apparatus in FIG. 1.

As shown in FIG. 5, a shutter opening means 32 is placed between the disc receiving opening 4 and the turn table 5. The shutter opening means includes a lever 32a, held by a fixed axis 32c, and a spring 32b for returning the lever 32a. As a disc cartridge 9 is transferred by the transfer means 3 to the turn table 5, the top end of the lever 32a is engaged with a hollow 26 of the shutter 33. As the shutter 33 transfers the disc cartridge 9, the lever 32a is rotated in the B direction, and then the shutter 33 shifts towards the C direction to open the disc exposing window 9a of disc cartridge 9.

In accordance with the present invention described above, the specific operation of loading a naked disc 12 onto the disc loading apparatus is explained hereafter referring to FIGS. 6 through 9.

FIG. 6 illustrates a disc 12 to be inserted in the disc receiving opening 4. The moving body 16 of the holding means 2 is shown in a stand-by position near the disc receiving opening 4, while the holding hooks 20 are at the recess 7.

Figure 7:
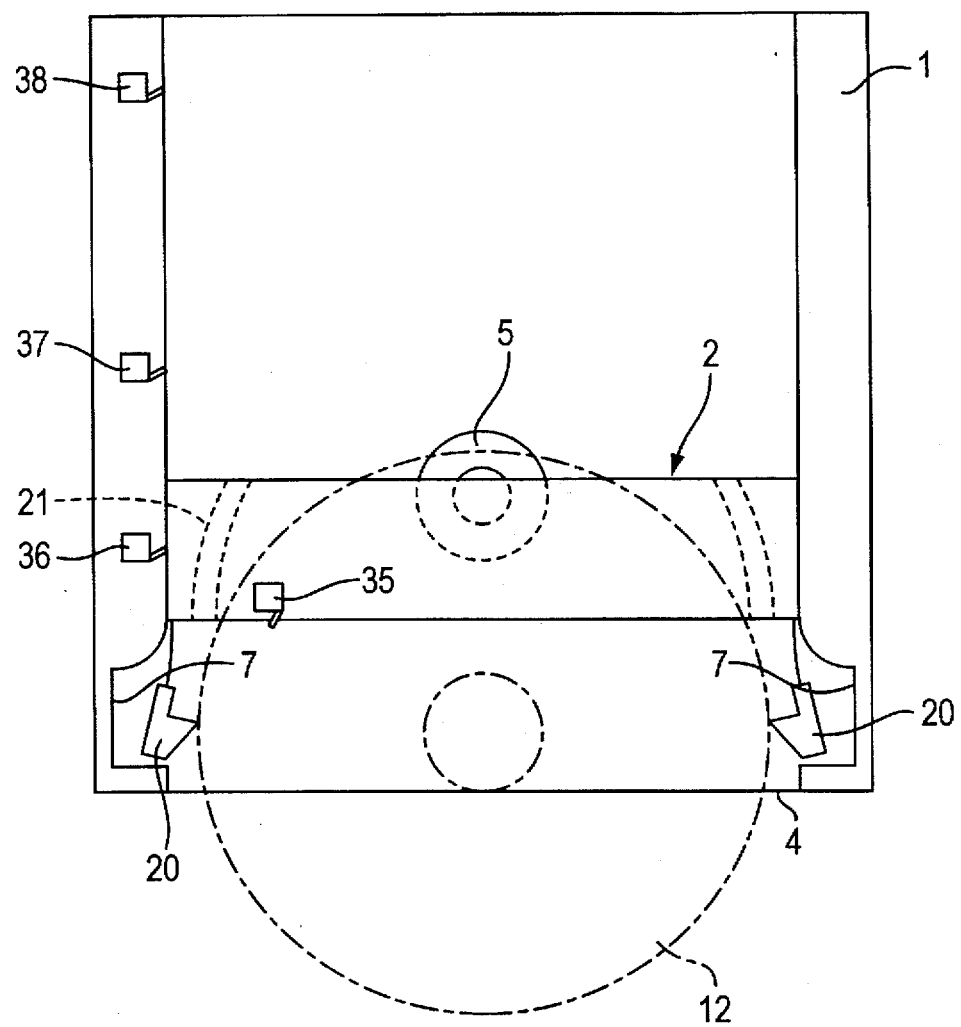
FIG. 7 shows a state of the disc loading apparatus in FIG. 1 just before a naked disc is held by a second holding device.

As shown in FIG. 7, once a disc 12 is inserted at the disc receiving opening 4, the edge of the disc 12 presses against the holding hooks 20 causing the holding hooks 20 to retract into the recesses 7 for opening.

Figure 8:
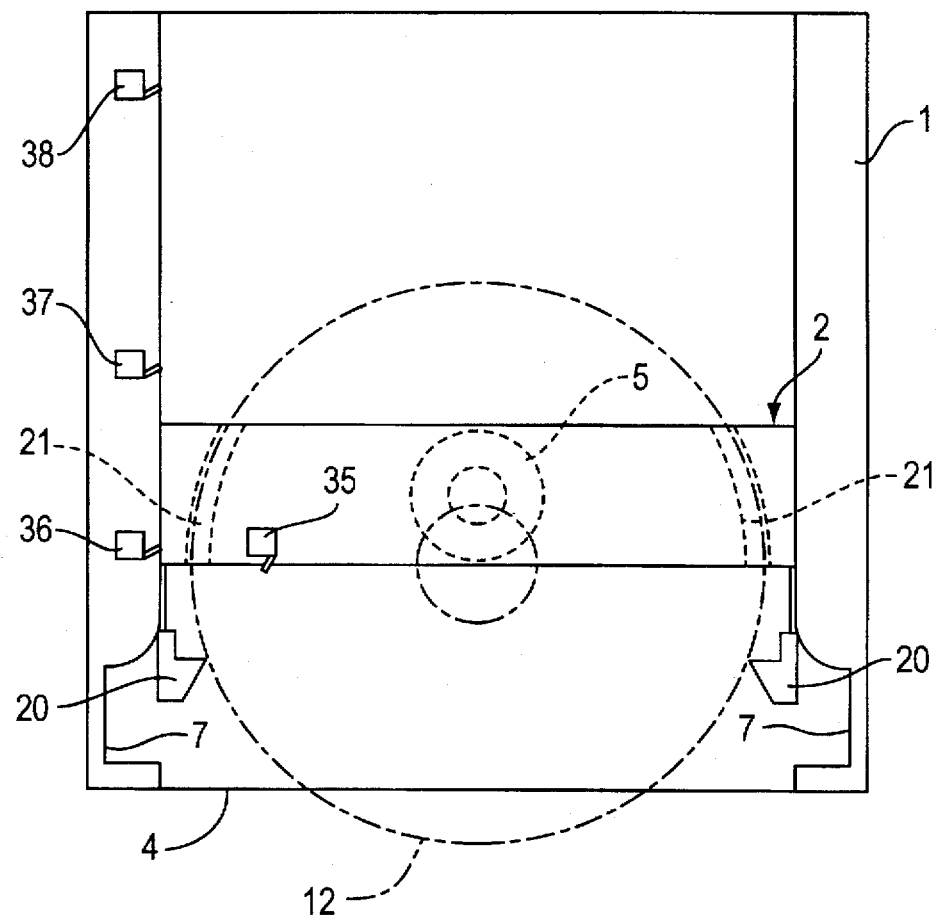
FIG. 8 shows a state of the disc loading apparatus in FIG. 1 with a naked disc being held by a second holding device.

As shown in FIG. 8, as the disc is further inserted, the front circumferential edge of the disc 12 reaches the arc hollows 21 of the aligning devices 15 where the disc 12 is then guided by the aligning devices 15. Simultaneously, the rear circumferential edge of disc 12 is held by the holding hooks 20.

Subsequently, as the disc 12 is held by the second holding device 19, the disc 12 is shifted slightly toward the inserting A direction by the transfer means 3. Furthermore, once the holding means 2 is detected by the second position sensor 37, the transfer means 3 stops its movement and the disc 12 is positioned onto the turn table 5. Thereafter, the turn table 5 is lifted up and the disc 12 is magnetically held on the turn table by the magnet located therein. At which point, the disc 12 is rotated on the turntable 5 for the writing/reading mode of head 6.

Figure 9:
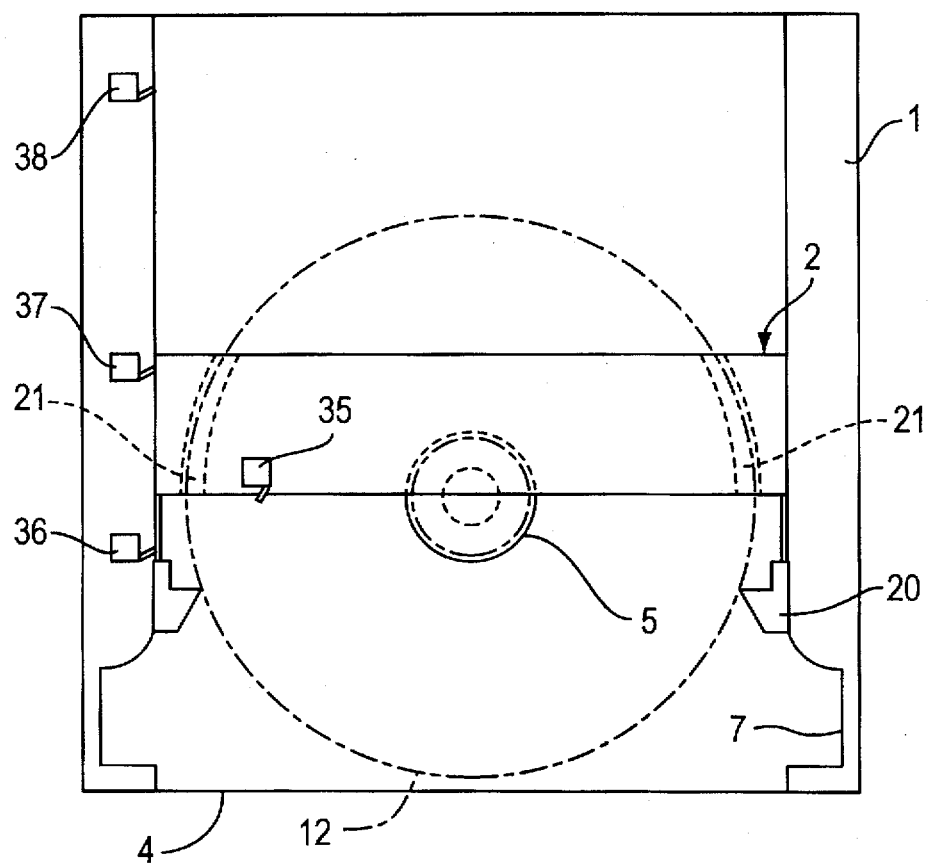
FIG. 9 shows a state of the disc loading apparatus in FIG. 1 when a naked disc, held by a second holding device, is transferred to the turn table.

Once the writing/reading mode is completed and the disc 12 is removed, the turn table separates from the disc 12 by dropping downward. By reversing the transfer means 3, the holding means 2 moves from the state as shown in FIG. 9, and moves in a direction opposite to the A direction where it will return to the stand-by position as shown in FIG. 8. At which point, a portion of the disc 12 exits the disc receiving opening 4 where the disc 12 can be removed. While the disc 12 is being removed, the compressive forces exhorted by the spring reeds 22 and the holding hooks 20 is continually applied to the disc 12.

Next, in accordance with the present invention, the specific operation of loading a disc cartridge 9, rather than a naked disc 12 discussed above, onto a disc loading apparatus is described hereafter as illustrated in FIGS. 10 through 13.

Figure 10:
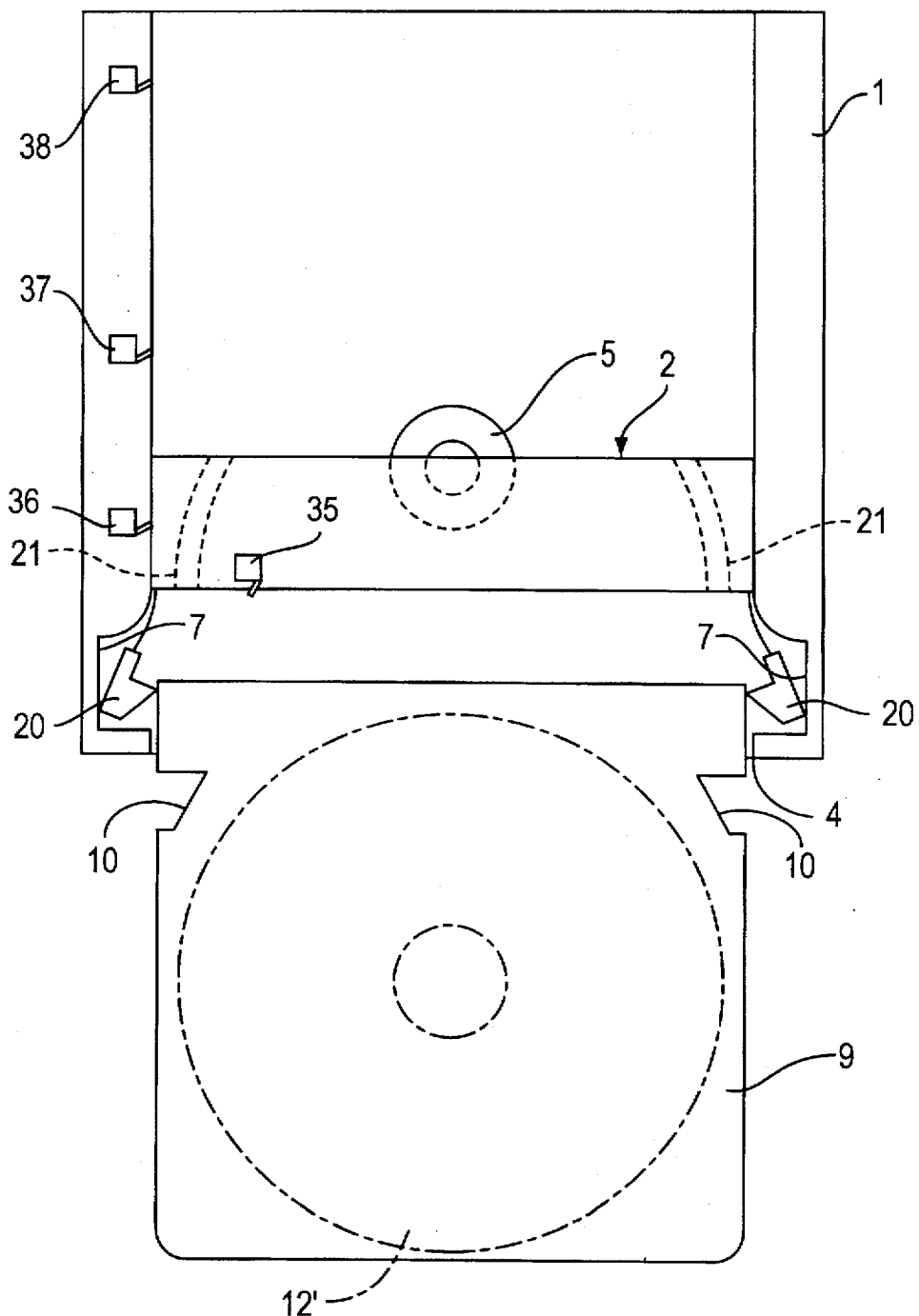
FIG. 10 shows a state of the disc loading apparatus in FIG. 1 before a disc cartridge is inserted.

As shown in FIG. 10, as a portion of the disc cartridge 9 is inserted in the disc receiving opening 4, the disc cartridge 9 presses outward against the holding hooks 20, causing them to retract into the recess 7 for their open positions.

Figure 11:
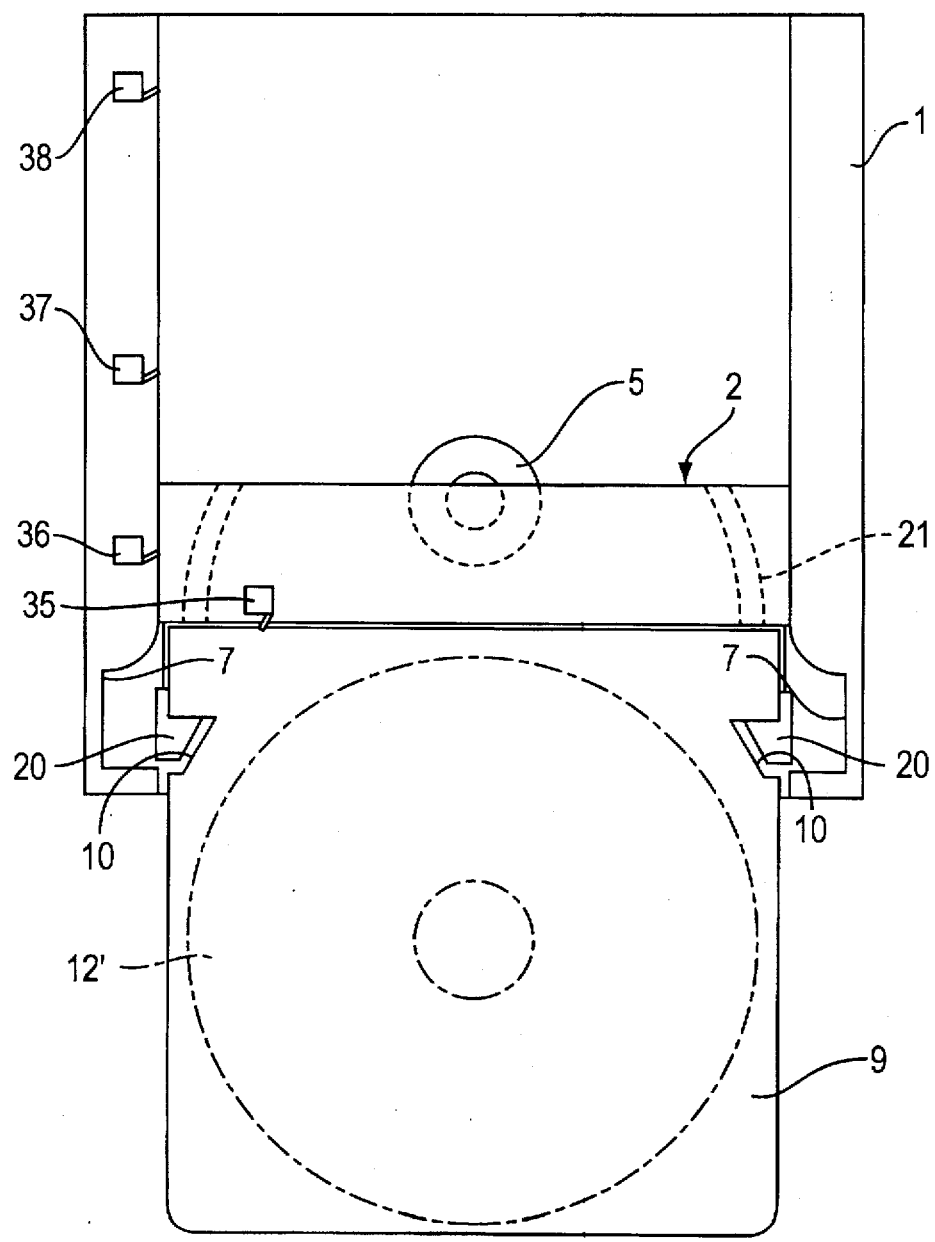
FIG. 11 shows a state of the disc loading apparatus in FIG. 1 with a disc cartridge being held by a first holding device.

As shown in FIG. 11, when the disc cartridge is further inserted, the holding hooks 20 return to fit into the notches 10 of the disc cartridge 9. Meanwhile, the top edge of disc cartridge 9 presses against the disc cartridge detector 35.

Figure 12:
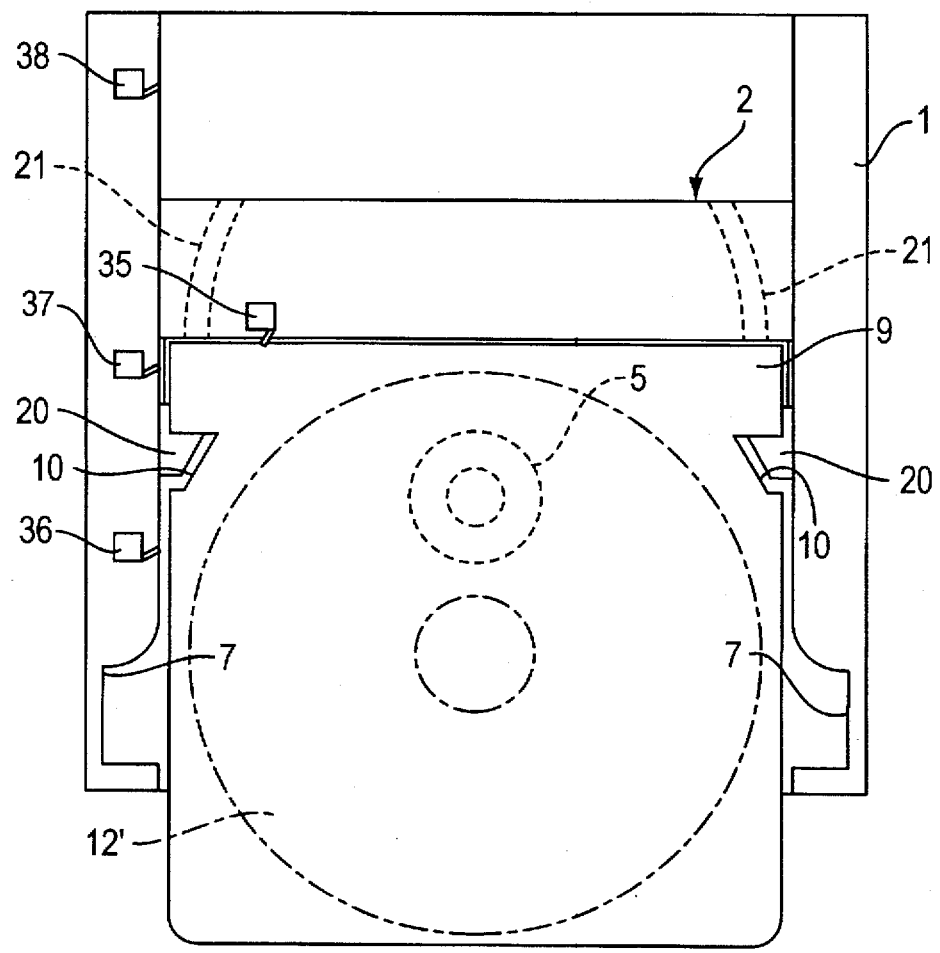
FIG. 12 shows a state of the disc loading apparatus in FIG. 1 with a disc cartridge being transferred.

As shown in FIG. 12, although the position sensor 37 is pressed by the holding means 2 by the motion of the transfer means 3, the motion of transfer means 3 will continue as long as the disc cartridge 9 engages the disc cartridge detector 35.

Figure 13:
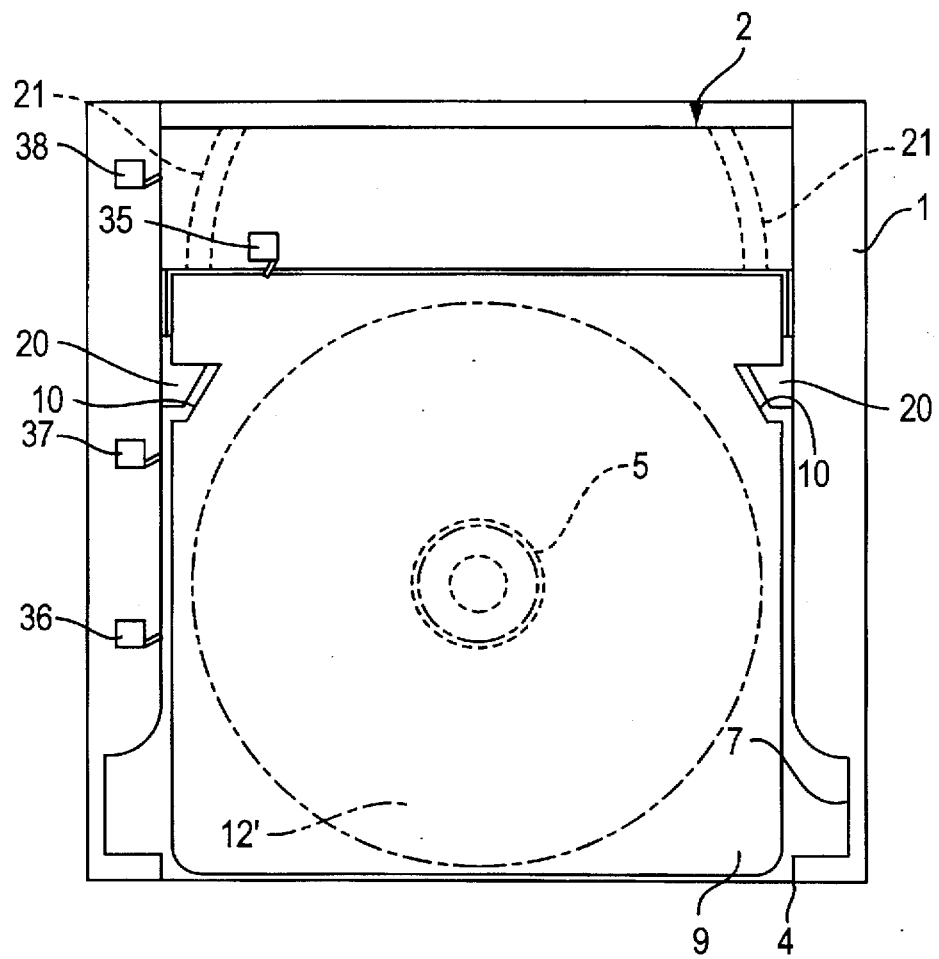
FIG. 13 shows a state of the above disc loading apparatus when a disc cartridge is being transferred onto the turn table.

As shown in FIG. 13, the holding means 2 continues to move until it contacts the position sensor 38. At this point, the motion of the transfer means 3 stops and the disc 12' in disc cartridge 9 is positioned onto the turn table 5. Once the disc cartridge 9 reaches the position of turn table, the shutter opening means 32 opens the shutter 33.

Thereafter, the turn table 5 is lifted up and the disc 12 is magnetically held on the turn table by the magnet therein. At which point, disc 12 is rotated on the turntable 5 for the writing/reading mode of head 6.

Once the writing/reading mode is completed and the disc 12 is removed, the turn table is separated from the disc 12 by dropping downward. By reversing the transfer means 3, the holding means 2 moves from the state as shown in FIG. 13, via the intermediate position shown in FIG. 12, to the stand-by position as shown in FIG. 11. At which point, a portion of the disc cartridge 9 exits from the disc receiving opening 4, where the disc cartridge 9 can then be removed. While the disc cartridge 9 is being removed, the hooks 20 open by retracting to the recesses 7. In turn, this enables the disc cartridge 9 to be removed from the disc receiving opening 4.

The present invention described above provides a number of significant advantages. For example, the disc loading apparatus employs a common disc loading facility for selectively holding a naked disc 12 and disc cartridge 9. Since the loading apparatus does not employ a tray, the present disc loading apparatus is thinner compared with a conventional disc loading apparatus, which employs a tray to hold a naked disc and a disc cartridge.

Additional variations on the present invention described above are possible. For example, while the above-mentioned embodiment raises and lowers the turn table 5 in combination with the entire body of the disc motor 8, an alternate embodiment may provide the same results by raising and lowering only the shaft of disc motor 8.

Next, in the present invention, the standing position of a disc cartridge 9 on the turn table 5 differs compared with the position of the naked disc 12. This difference in positions is compensated for by adjusting the height of turn table 5 by a control means. In an alternate embodiment, the adjusting mechanism with a control means, may be eliminated by aligning the holding means 2 in such a way whereby the height of disc 12' in a disc cartridge 9 coincides with that of a naked disc 12 held in the holding means 2.

Moreover, in the present invention, the location of the center of the disc 12' in a disc cartridge 9, which is held by the first holding device 18 of the holding means 2, does not coincide with the center of disc 12, which is held by the second holding device 19 of the holding means 2. However, in an alternate embodiment, these center positions may coincide. In which case the respective transfer lengths of the transfer means 3 for the disc cartridge 9 and the disc 12 would be equivalent.

Furthermore, in the present invention, some of the elements of the first holding device 18 and the second holding device 19 share common parts. However, in an alternate embodiment, these devices may exist without sharing common parts. For example, the second holding device 19 may be designed to hold a disc 12 at the circumferential edge with plural arms having rollers. Thereby, eliminating the common arc hollow 21.

Regarding the above-mentioned alternate embodiment, if the first holding device 18 and the second holding device 19 share no common parts, the insertion of the disc 12 and the disc cartridge 9 is still possible because the first holding device 18 elastically fits with the notches 10 of the disc cartridge 9 and the second holding device 19 elastically fits with the disc 12 circumference.

Also, in the present invention, the aligning devices 15 regulate the positioning of the arc hollows 21. However the same results may be accomplished in an alternate embodiment by using one or more pins.

Additionally, the material and shape of the spring reed 22 in the present invention are not limited to the specifications previously discussed. Rather, in an alternate embodiment, the spring reed 22 may be comprised of an arm having a spring and a holding hook 20 at the end of the arm.

In other alternate embodiments, the spring reed 22 and the holding hook 20 may be a single structure if the top end of spring reed 22 is folded to create a hook shape, providing a folding elasticity to the folded hook itself. The spring reed 22 and holding hook 20 may function either as a pair or independently. In the latter case, an alternate embodiment may omit the holding hook entirely, or include the holding hook, but without elastic properties.

Furthermore, mechanisms other than the present invention's transfer means 3 and pulley and belt may be utilized in alternate embodiments. For instance, a rack and pinion may be utilized for converting the rotational movement into linear movement.

Finally, other possible embodiments for holding a disc 12 are specifically described below, as illustrated in FIGS. 14 through 17.

Figure 14A:
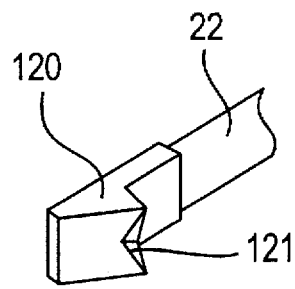
FIG. 14(a) shows a perspective view of a disc holding hook according to an alternate embodiment of the disc loading apparatus in FIG. 1.
Figure 15A:
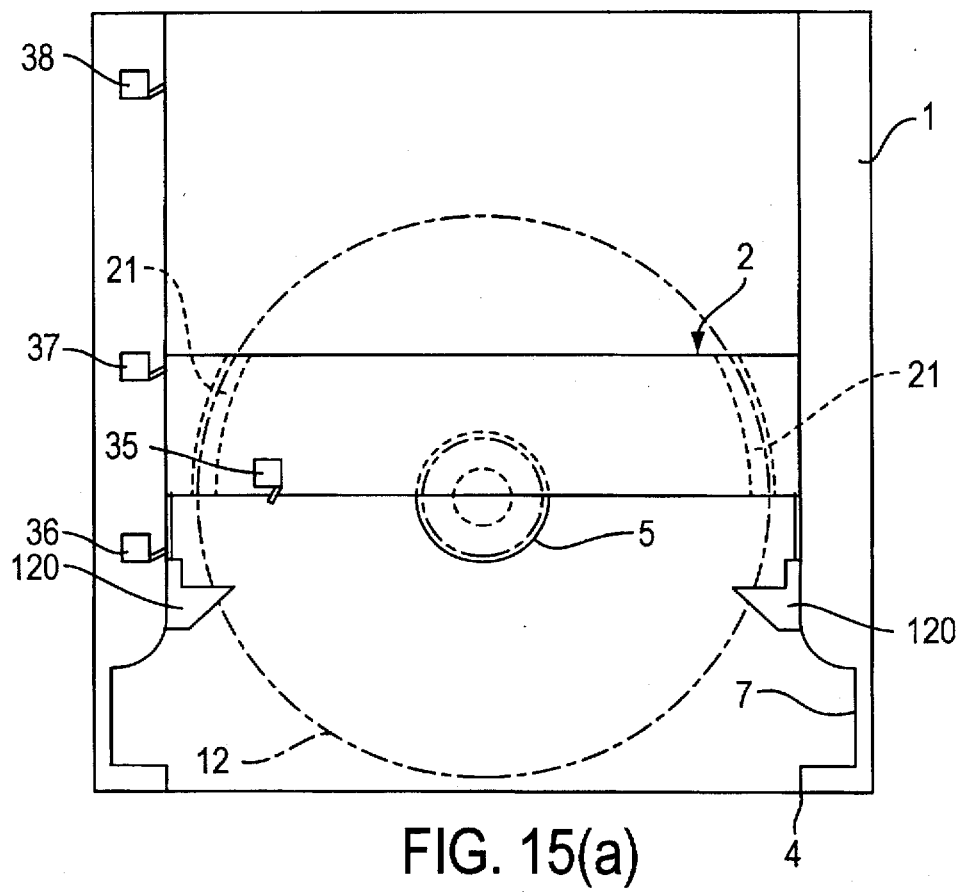
FIG. 15(a) shows a naked disc being held by the alternate holding hooks in FIG. 14(a).
Figure 15B:
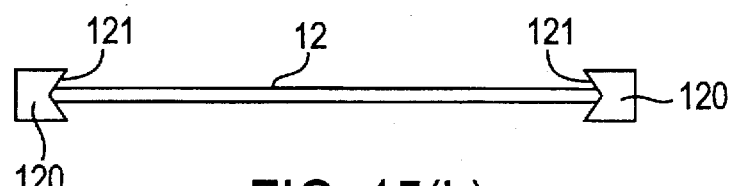
FIG. 15(b) is side view of a key part of FIG. 15(a).

As illustrated in FIG. 14(a), a holding hook 120 is provided with a groove 121. In this embodiment, a disc 12 is held by the groove 121 and aligned as shown in FIGS. 15(a) and (b).

Figure 14B:
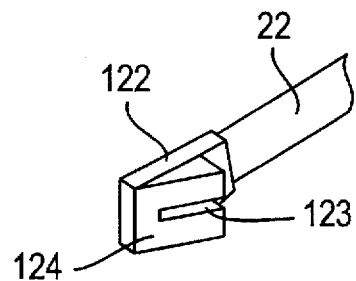
FIG. 14(b) shows a perspective view of a disc holding hook according to an alternate embodiment of the disc loading apparatus in FIG. 1.
Figure 16A:
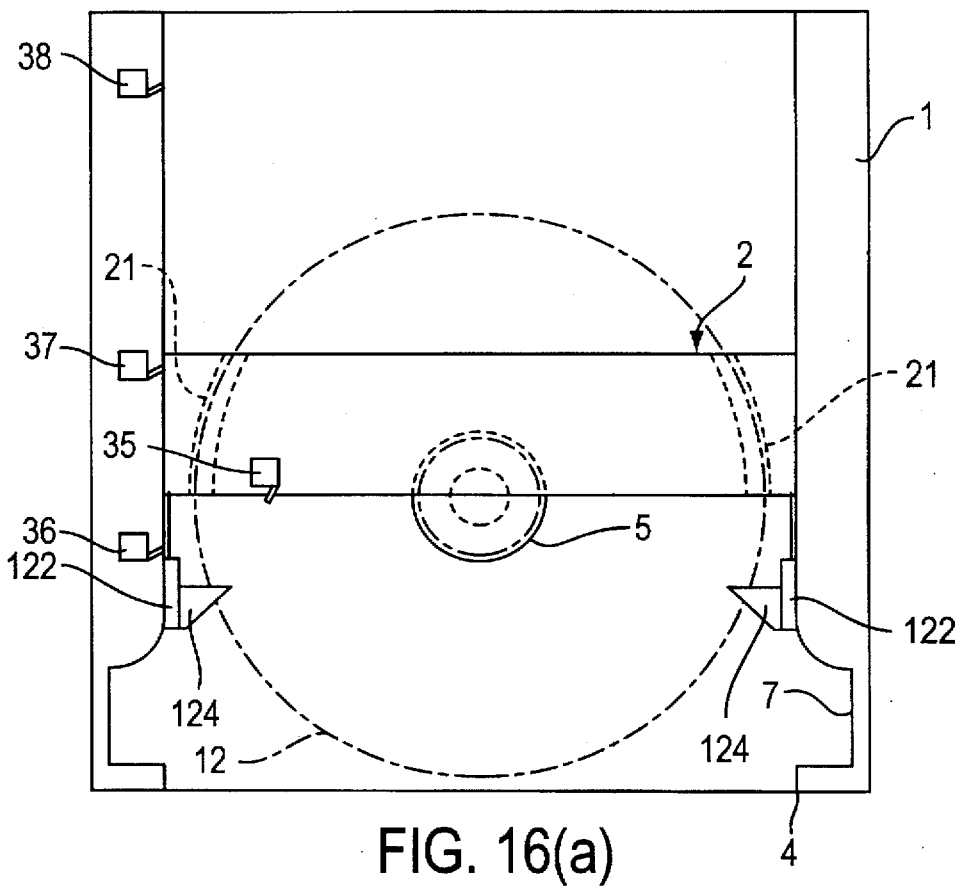
FIG. 16(a) shows a naked disc being held by the alternate holding hooks in FIG. 14(b).
Figure 16B:
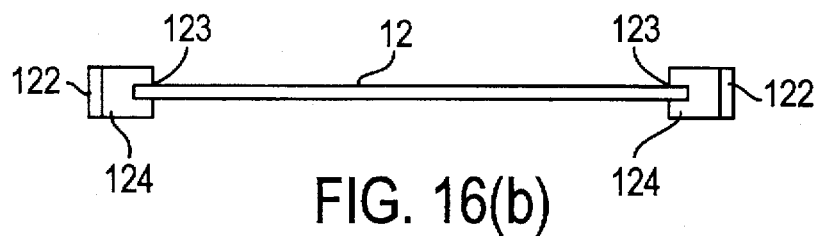
FIG. 16(b) is side view of a key part of FIG. 16(a).

As illustrated in FIG. 14(b), a holding hook 122 is provided with a nail 124 having a slit 123, made of, for example, an elastic material like rubber. In this embodiment, a disc 12 is held by the slit 123 and aligned as shown in FIGS. 16(a) and (b). Due to the nail's elastic material, a disc 12 is held, with a high frictional force, in a stable manner.

Figure 14C:
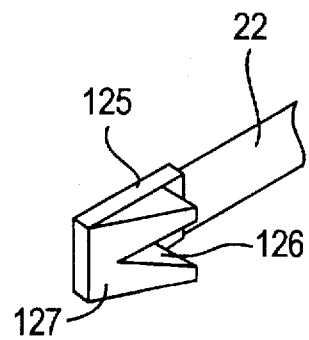
FIG. 14(c) shows a perspective view of a disc holding hook according to an alternate embodiment of the disc loading apparatus in FIG. 1.
Figure 17A:
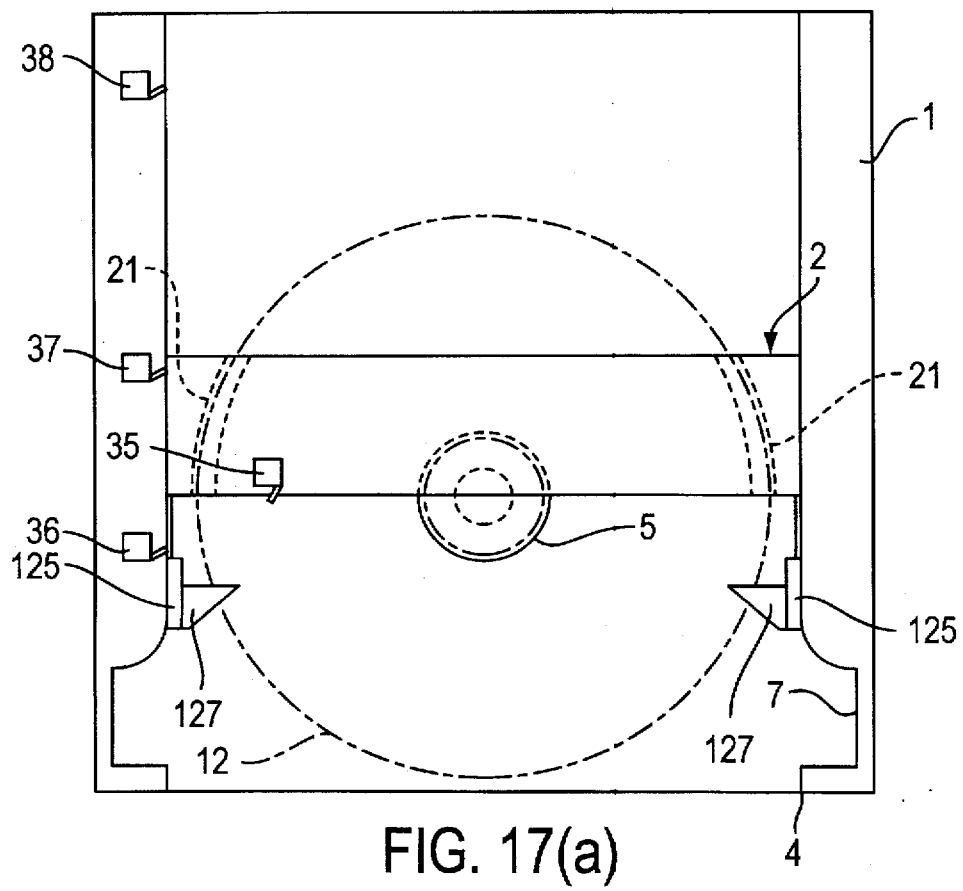
FIG. 17(a) shows a naked disc being held by the alternate holding hooks in FIG. 14(c).
Figure 17B:
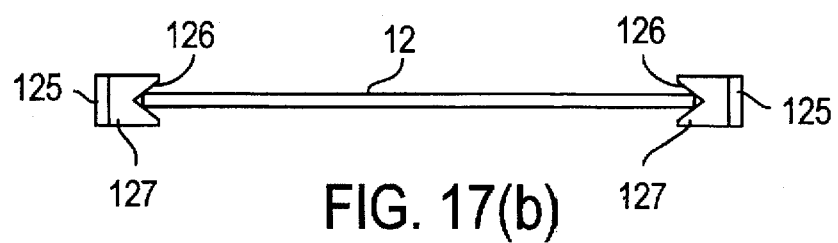
FIG. 17(b) is side view of a key part of FIG. 17(a).
Figure 18:
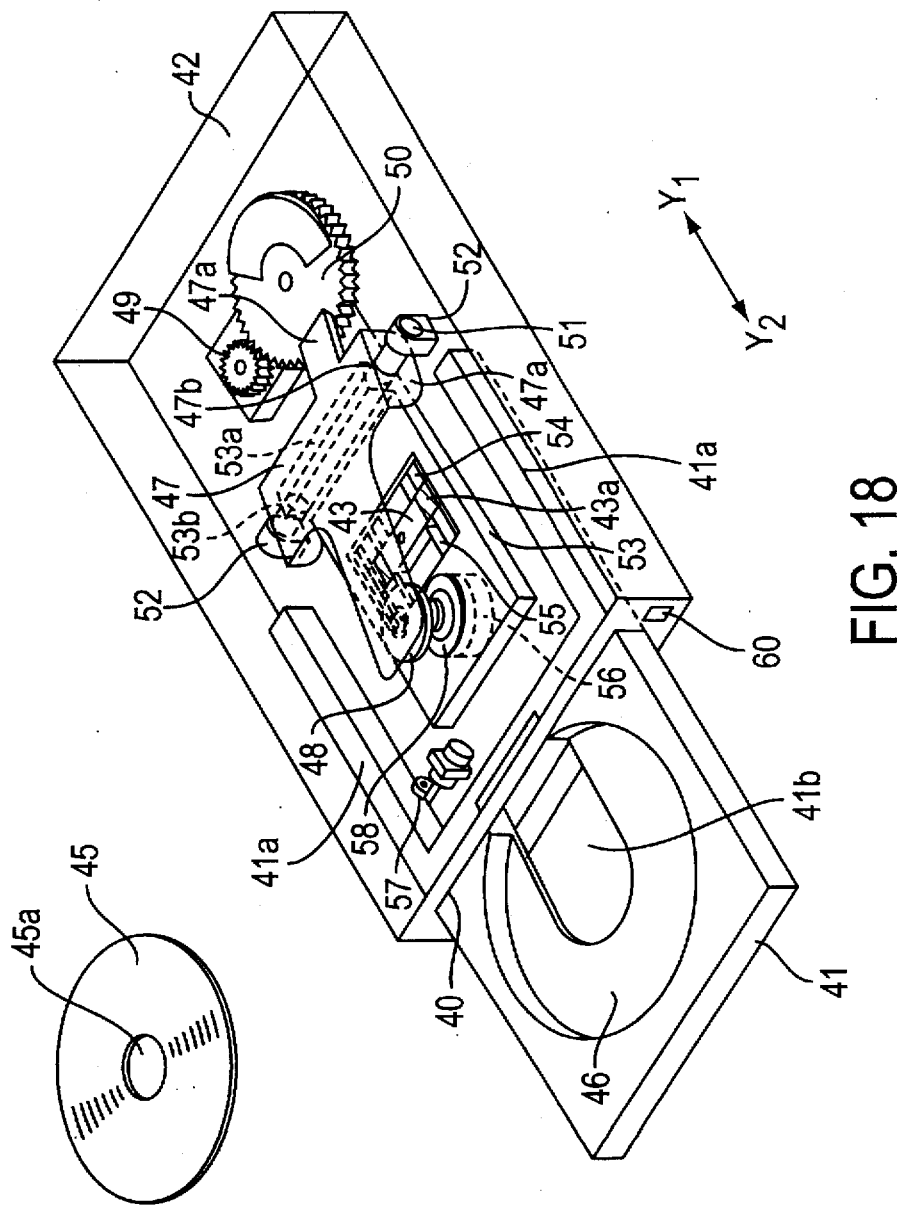
FIG. 18 shows perspective view of a conventional disc loading apparatus.
Figure 19A:
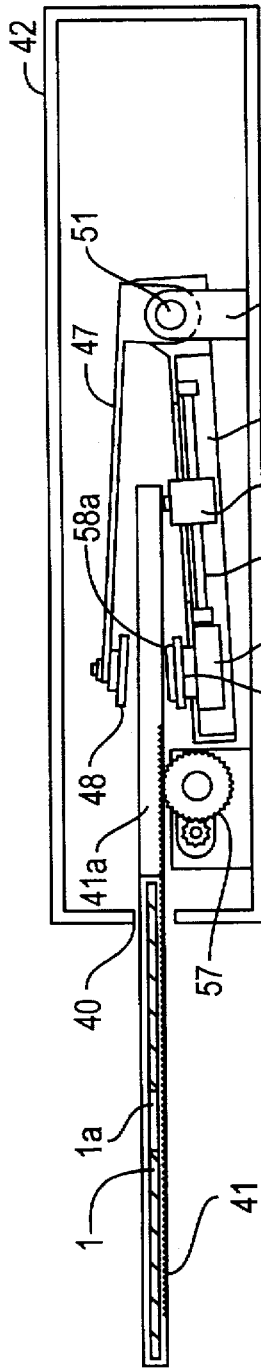
FIG. 19(a) is a cross sectional view of the disc loading apparatus in FIG. 18 in the load/unload position.
Figure 19B:
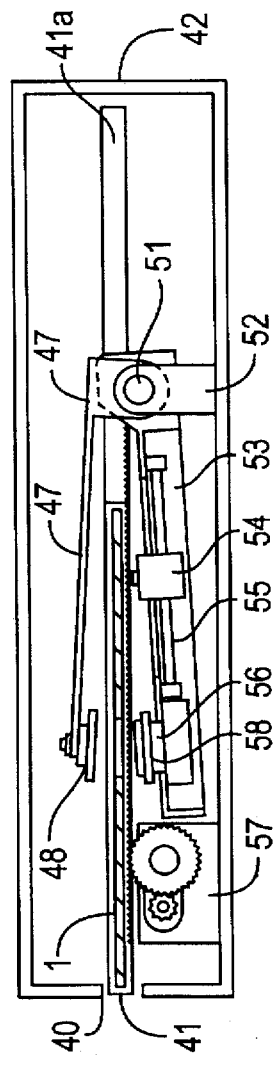
FIG. 19(b) is a cross sectional view of the disc loading apparatus in FIG. 18 in the transferring mode.
Figure 19C:
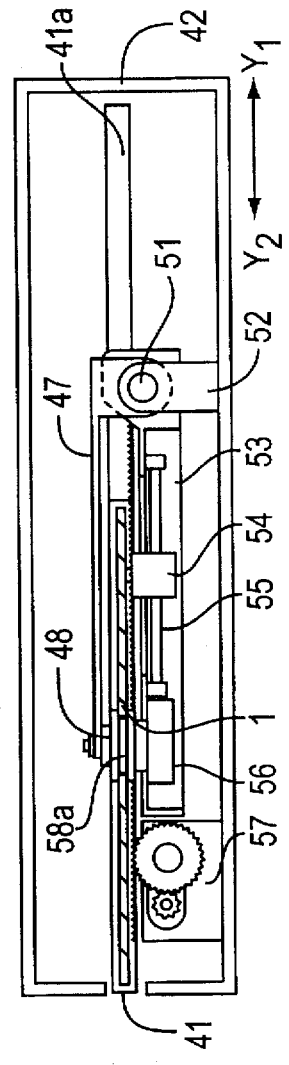
FIG. 19(c) is a cross sectional view of the disc loading apparatus in FIG. 18 in the operating mode.

As illustrated in FIG. 14(c), a holding hook 125 is provided with a nail 127 having a groove 126, made of, for example, an elastic material like rubber. In this embodiment, a disc 12 is held by the groove 126 and aligned as shown in FIGS. 17(a) and (b). Due to the nail's elastic material, a disc 12 is securely held, with a high frictional force, in a stable manner.

The present invention described above provides a number of significant advantages. For example, a disc loading apparatus according to the present invention, which employs a common disc loading facility, can selectively hold a naked disc 12 and a disc cartridge 9 on a holding means 2 for loading. Moreover, because the apparatus does not require a tray, a thinner disc loading apparatus can be implemented, as compared with the conventional apparatuses which hold a disc and a disc cartridge on a tray.

As yet another advantage, the design of the hook part 20 is simplified because some parts of the first holding device 18 can be used in common with parts of the second holding device 19.

An additional advantage of the present invention is that incidental separation of the disc 12 or disc cartridge 9 from the holding means 2 during operation is prevented by the regulating mechanism which controls the holding hooks 20 from opening. As a result, the requisite compressive forces of the spring reed 22 for holding a disc 12 and a disc cartridge 9 is less compared with the conventional designs.

Finally, the present invention provides an advantage due to its recesses 7, utilized for opening and closing the holding hooks, which facilitate a smooth insertion and removal of the disc 12 and disc cartridge 9.

Of course, it should be understood that a wide range of changes and modifications can be made to the first embodiment of the present invention described above. It is therefore intended that the foregoing detailed description be understood that it is the following claims, including all equivalents, which are intended to define the scope of this invention.

What is claimed is:

1. A disc loading apparatus, comprising:

an overall holding device with a first holding device for elastically fitting with a holding notch provided at both sides of a disc cartridge inserted in a disc receiving opening and a second holding device for elastically fitting against a circumferential edge of a naked disc inserted in said disc receiving opening, and wherein said overall holding device is movable by a transfer means along a direction connecting said disc receiving opening and a turn table, and said transfer means for transferring said overall holding device so that said naked disc and a disc housed in said disc cartridge travel between said disc receiving opening and said turn table, wherein said overall holding device is comprised of a moving body, a pair of aligning devices provided at both sides of the moving body for regulating the positioning of a naked disc by conforming with arcs of circumferential edge of the naked disc in the front side of inserting direction, a pair of spring reeds stretching from the aligning devices towards the disc receiving opening and are elastically deformable in opposite directions relative to said naked disc, and holding hooks provided opposing to each other at the top end of these spring reeds for resiliently pressing against arcs of the circumferential edge of the naked disc in the rear side of inserting direction as well as with the holding notches of a disc cartridge, and said second holding device comprises said aligning devices and said holding hooks, and said first holding device shares said holding hooks in common with said second holding device.

2. A disc loading apparatus according to claim 1, comprising:

a control part to regulate said holding hooks fitting with either a naked disc or a disc cartridge from opening, and a recess for allowing the holding hook to open, provided at a place located in an end of said control part where the insertion and removal of a naked disc and a disc cartridge is made possible.

3. A disc loading apparatus according to claim 1, wherein a tip of holding hook distal from said spring reed is provided with a groove for fitting with a naked disc.

4. A disc loading apparatus according to claim 1, wherein a tip of holding hook distal from said spring reed is made of an elastic material and is provided with a groove for fitting with a naked disc.

* * * * *